(12) United States Patent
Haban et al.

(10) Patent No.: US 8,151,029 B2
(45) Date of Patent: Apr. 3, 2012

(54) CONTROLLING PASSTHROUGH OF COMMUNICATION BETWEEN MULTIPLE BUSES

(75) Inventors: Scott Haban, Austin, TX (US); Dylan Hester, Austin, TX (US); Ruifeng Sun, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 12/981,769

(22) Filed: Dec. 30, 2010

(65) Prior Publication Data

US 2011/0099310 A1    Apr. 28, 2011

Related U.S. Application Data

(63) Continuation of application No. 12/154,265, filed on May 21, 2008, now Pat. No. 7,882,282.

(51) Int. Cl.
*G06F 13/00* (2006.01)
(52) U.S. Cl. ............. 710/316; 710/38; 710/52; 710/110
(58) Field of Classification Search .................. 710/31, 710/38, 52, 110, 306, 316; 348/725, 726, 348/731
See application file for complete search history.

(56) References Cited

U.S. PATENT DOCUMENTS

| | | | |
|---|---|---|---|
| 5,404,460 A * | 4/1995 | Thomsen et al. ................. 710/9 |
| 6,219,095 B1 * | 4/2001 | Zhang et al. .................. 348/192 |
| 6,233,635 B1 | 5/2001 | Son | |
| 6,799,235 B2 * | 9/2004 | Bormann et al. ............. 710/110 |
| 6,816,203 B2 * | 11/2004 | White ........................... 348/607 |
| 6,842,806 B2 * | 1/2005 | Ervin ............................ 710/110 |
| 6,874,052 B1 | 3/2005 | Delmonico | |
| 6,928,501 B2 * | 8/2005 | Andreas et al. ............... 710/110 |
| 7,092,041 B2 | 8/2006 | Lendaro | |
| 7,565,470 B2 * | 7/2009 | Lin ............................... 710/110 |
| 2006/0215590 A1 * | 9/2006 | Sharma et al. ................. 370/311 |
| 2007/0070251 A1 * | 3/2007 | White et al. .................. 348/607 |
| 2009/0054022 A1 * | 2/2009 | Kobayashi et al. ........ 455/186.1 |

FOREIGN PATENT DOCUMENTS

| | | |
|---|---|---|
| JP | 2002-175269 | 6/2002 |
| KR | 10-1999-000967 | 2/1999 |
| KR | 10-2005-002459 | 3/2005 |

OTHER PUBLICATIONS

PCT/US2009/044661 International Search Report and Written Opinion of the International Searching Authority mailed on Dec. 23, 2009.

* cited by examiner

*Primary Examiner* — Khanh Dang
(74) *Attorney, Agent, or Firm* — Trop, Pruner & Hu, P.C.

(57) ABSTRACT

A demodulator can include first data and clock pads to couple the demodulator to a host device via a first bus, and second data and clock pads to couple the demodulator to a radio frequency (RF) tuner via a second bus. The device may further include passthrough logic to couple host data and a host clock from the first bus to the second bus and to couple tuner data from the second bus to the first bus during a passthrough mode. During this mode, however, the two buses may remain electrically decoupled. When the passthrough mode is disabled, the RF tuner is thus shielded from noise present on the first bus.

16 Claims, 7 Drawing Sheets

CONTROLLING PASSTHROUGH OF COMMUNICATION BETWEEN MULTIPLE BUSES

This application is a continuation of U.S. patent application Ser. No. 12/154,265, filed May 21, 2008, now U.S. Pat. No. 7,882,282 entitled "CONTROLLING PASSTHROUGH OF COMMUNICATIONS BETWEEN MULTIPLE BUSES," the content of which is hereby incorporated by reference.

BACKGROUND

In many electronic systems, such as wireless devices, mobile devices and so forth many or all components of the system are interconnected by a two-wire bus (clock and data) which follows the inter-integrated circuit ($I^2C$) standard. Usually a central microcontroller (i.e., a host) will implement an "$I^2C$ master" function, which allows it to initiate data transfers to and from the other components in the system. The other components will implement a slave controller function, which generally includes a set of registers that can be written or read by the host to control the functions of the component. Each slave is identified by a unique address sent by the master at the beginning of each transaction to identify the intended slave.

In a complex system, the shared $I^2C$ bus may be very active, since the host may be frequently communicating with many of the components in the system. This activity is a source of electrical noise that couples into all of the components connected to the bus. The noise can be especially problematic for analog circuitry such as present wireless systems that may include a radio frequency (RF) tuner, since such analog circuitry is very sensitive to noise. Specifically, the tuner includes circuitry to amplify very low voltage signals from a receiving antenna, high-frequency oscillators, analog mixers, and circuitry to perform analog-to-digital and digital-to-analog conversion. A need thus exists to isolate such analog circuitry in order to reduce the amount of noise encountered by, e.g., an RF tuner.

SUMMARY OF THE INVENTION

According to one aspect, the present invention includes a semiconductor device such as a demodulator having multiple data and clock pads that are to couple the device to multiple buses. Specifically, the demodulator can include first data and clock pads to couple the demodulator to a host device via a first bus, and second data and clock pads to couple the demodulator to a radio frequency (RF) tuner via a second bus. The device may further include passthrough logic to couple host data and a host clock from the first bus to the second bus and to couple tuner data from the second bus to the first bus during a passthrough mode. During this mode, however, the two buses may remain electrically decoupled.

To enable orderly communication over these buses using a given protocol, the demodulator may have multiple input paths from the first data pad to a slave controller of the demodulator and to the second data pad, respectively. The first input path may be a filtered path and the second input path may be an unfiltered path.

Yet another aspect of the present invention is directed to a system having a host device and multiple slave devices. The host device, which may be a microprocessor or other such controller, is coupled to a first bus that is also coupled to various slave devices. These devices may include a first slave device that has a slave state machine to handle receipt and transmission of information on the first bus. Furthermore, a second slave device may in turn couple to the first slave device via a second bus. The slave state machine can enable mirrored communication along the first bus to the second slave device via the second bus under control of the host device. In one such implementation, this mirrored communication may begin at an end of a transaction from the host device to the first slave device including a mirrored communication command. To aid in analysis and control of these mirrored communications, passthrough logic of the first slave device can buffer communications along the first bus to the second bus without an electrical connection between the first and second buses.

Yet another aspect of the present invention is directed to a method for determining whether a passthrough command has been received within a transaction from a host to a first slave device on a first bus. If so, a passthrough mode indicator is set in a control register of the first slave device. In turn, a passthrough enable signal is sent at an end of the transaction from a state machine of the first slave device to a passthrough circuit of the first slave device to enable a passthrough mode, which then enables the buffering of communications between the first bus and a second bus coupled between the first slave device and a second slave device in the passthrough mode. To aid in the buffered communications, data and control information communicated on the first and second buses may be analyzed in the state machine of the first slave device to determine and control a direction of communication flow between the host and the second slave device.

A still further aspect of the present invention is directed to an integrated circuit having an analog front end to receive incoming modulated tuner signals via a first link with a tuner and to convert the incoming modulated tuner signals to a digital bitstream, and a demodulator coupled to the analog front end to receive the digital bitstream and to demodulate the digital bitstream into a demodulated bitstream to be provided to a host processor. A first bus interface is coupled to a first bus coupled between the integrated circuit and the host processor, and a second bus interface is coupled to a second bus coupled between the integrated circuit and the tuner. These bus interfaces may provide for passthrough communications between the buses when enabled. Otherwise, the interfaces may prevent such passthrough so that the tuner and the second bus do not suffer from noise that may be present on the first bus. To this end, a passthrough circuit may be coupled to the bus interfaces to buffer data between the buses when enabled, and otherwise to shield the second bus from noise present on the first bus.

DETAILED DESCRIPTION

In various embodiments, to reduce any noise inherent on a system bus due to the amount of signaling present on the bus, embodiments may provide one or more secondary buses for communication with one or more sensitive components of a system. While the scope of the present invention is not limited in this regard, embodiments may be applicable to an I²C bus, although other communication protocols can also use the techniques described herein.

In various implementations, an intermediate component, such as a slave device to a master device coupled to the primary system bus can act as an intermediary between the host device on the primary bus and one or more other slave devices that may be sensitive to noise, and that are coupled to the slave device via one or more secondary buses. In this way, the slave device can act as a controller to enable passthrough communications between the host device and the one or more secondary devices. More specifically, to enable such communications, passthrough logic of the slave device may enable communication from the primary bus to passthrough to the secondary bus and vice-versa. Still further, such communications may occur without a direct electrical coupling between the two buses. In this way, problems inherent in providing an electrical connection or short (such as an electrical coupling using pass gate switching or so forth) between the two buses can be avoided. More so, the slave device can also act to snoop all communications on the two buses such that it can direct flow of communication between the host device and the one or more secondary devices.

Figure 1:
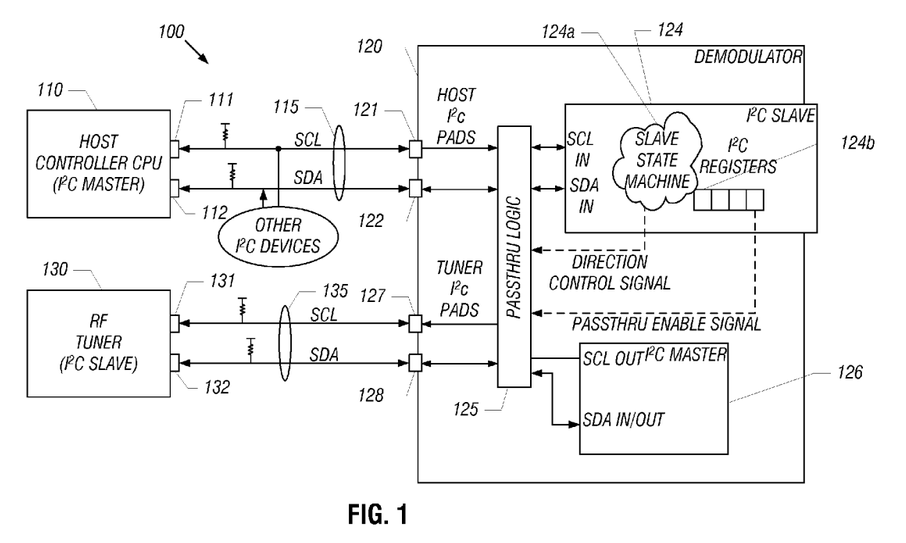
FIG. 1 is a block diagram of a portion of a system in accordance with one embodiment of the present invention.

Referring now to FIG. 1, shown is a block diagram of a portion of a system in accordance with one embodiment of the present invention. As shown in FIG. 1, system 100, which may be a given system such as a wireless device such as a cellular telephone, television receiver, radio receiver, portable internet device, or so forth, includes a host controller 110, which may be a central processing unit or other such controller device. As shown, host controller 110 is coupled to a demodulator 120 via a system bus 115. In the embodiment of FIG. 1, system bus 115 may be an I²C bus. Further, while not shown for ease of illustration in FIG. 1, understand that system bus 115 may be coupled to one or more other I²C devices. For example, such devices may include components for human interface such as keyboard, motion sensor and touch screen, components for display of text and visual images, components for playback and recording of audio and video, storage devices such as flash memory and EEPROM, components to allow the system 100 to communicate with other systems using various forms of wired communications such as RS-232, USB, IEEE 1394, and components which perform wireless communications such as Bluetooth, 802.11 protocols, and wireless telephony protocols such as GSM. Because much of the communications occurring within system 100 may occur on system bus 115, noise can occur, which may undesirably affect performance of various components. Such noise may particularly affect analog circuitry.

As further shown in the embodiment of FIG. 1, an RF tuner 130 is coupled to demodulator 120 via a secondary bus 135. Note that while shown with this bus connection 135, which in the embodiment of FIG. 1 is an I²C bus, it is to be understood that a signal path also couples from tuner 130 to demodulator 120 to provide signal information such as modulated data (e.g., TV or radio content). Because only a limited amount of communication may need to be sent or received from tuner 130 along secondary bus 135 during normal operation (e.g., control information, configuration information and so forth), in the absence of such communications secondary bus 135 may be disabled to thus shield tuner 130 from any noise inherent on system bus 115.

Thus as shown in FIG. 1, demodulator 120 may includes circuitry to allow a system designer to isolate tuner 130 on a dedicated I²C bus, while still allowing the existing I²C master (host controller 110) to communicate with tuner 130. Demodulator 120 implements a common slave controller 124, including a set of registers to control the demodulator itself. Two pads 121 and 122 of demodulator 120 connect directly to bus 115, so host 110 can control demodulator 120. Demodulator 120 also includes a second pair of pads 127 and 128, to connect directly to tuner 130 via bus 135.

For the vast majority of the time system 100 is operating, secondary bus 135 will see no activity, even if primary bus 115 is very active. However, host 110 can still communicate with tuner 130 by first enabling the passthrough mode by writing an indicator such as a register bit in demodulator 120. When the bit is set to 1 (e.g.), all traffic on primary bus 115 will be mirrored onto secondary bus 135, and vice-versa. In addition to communicating with tuner 130, host 110 can still communicate with demodulator 120 or any other slave on the primary bus 115. When host 110 is finished with a communication transaction with tuner 130, e.g., reading and writing the tuner's I²C registers to configure it, host 110 may disable passthrough mode by clearing the passthrough enable bit in register $124_b$, which in turn causes slave controller 124 to disable passthrough mode such that secondary bus 135 is inactive, therefore avoiding any noise concerns due to communications on system bus 115.

As further shown in FIG. 1, demodulator 120 includes a passthrough logic 125 which, as will be discussed further below may include various logic to operate under control of signals from slave controller 124 to enable and disable the passthrough mode. As will be further described, such passthrough logic may provide for multiple parallel communication paths for data, with one path corresponding to a filtered and/or delayed path and one path corresponding to an unfiltered and/or undelayed path, to allow for communications to occur within the delay parameters set by a given communication protocol, e.g., the I²C protocol.

As shown in FIG. 1, slave controller 124 may include a slave state machine $124_a$ and registers $124_b$, which may be I²C registers, one of which includes at least one bit to provide for storage of the passthrough indicator. Note that slave state machine $124_a$ may be a state machine configured to handle snooping and direction control of passthrough communications, in addition to standard slave state machine functions. As shown in FIG. 1, passthrough logic 125 may receive control signals, namely a direction control signal and a passthrough enable signal, from slave state machine $124_a$ and registers $124_b$. As further shown in FIG. 1, demodulator 120 may further include an integrated master controller 126, which can communicate directly with tuner 130 when passthrough mode is disabled. This allows demodulator 120 to configure the tuner itself, relieving host 110 of the burden of configuring tuner 130, in certain system implementations.

The I²C specification requires that both wires (data and clock) of the bus be pulled up to the system's logic high value (often 1.8 Volts (V), 3.3V or higher) by weak pullup resistors (or similar devices), which are always active. A system designer often chooses to place these resistors on the circuit board, but sometimes chooses to use resistors which are integrated within one of the connected chips. To communicate, a device pulls one or both lines down to a logic low value, overcoming the pullup resistors. The I²C master (e.g., host 110 of FIG. 1) is always responsible for pulling the SCL (clock) line low. The SDA (data) line can be pulled low by either master or a slave (e.g., demodulator 120 of FIG. 1), depending on whether the transaction is a read or write, and whether a data transfer or acknowledge cycle is occurring on the bus. The direction of SDA changes several times within an I²C transaction, since the receiver of the data must drive the SDA line low for 1 cycle after each byte is sent, to acknowledge that it has been received.

Figure 2:
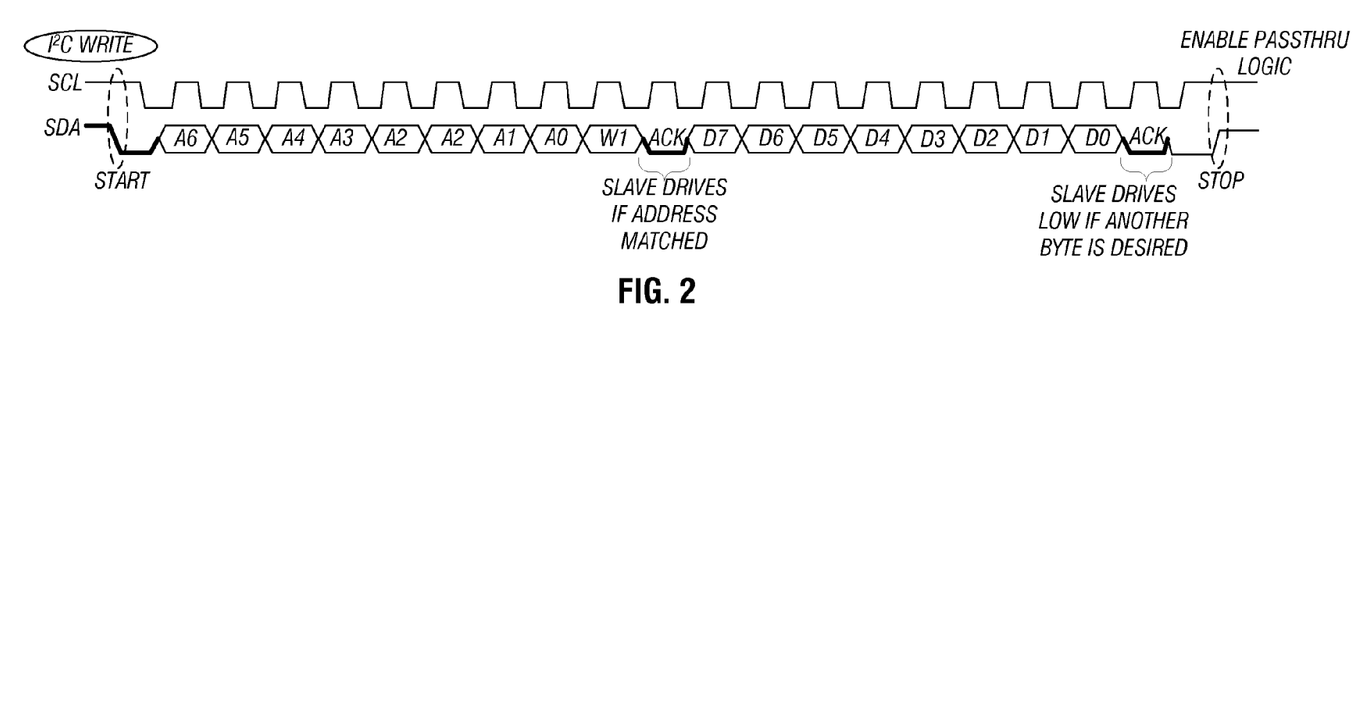
FIG. 2 is a timing diagram of communications in accordance with one embodiment of the present invention.

FIG. 2 shows a I²C write transaction. The darker lines illustrate cycles in which the data line, SDA, is under control of the slave, otherwise the signal is under control of the master. A transaction is begun when a unique "start" condition occurs, which is a falling edge of SDA while the clock line, SCL, is high. A transaction ends when a "stop" condition occurs, which is a rising edge of SDA while SCL is high. With the exception of the start and stop conditions, the SDA line must not change state while SCL is high. In other words, all transitions of SDA must occur while SCL is low. In fact, good I²C interface design practice requires any master or slave device to wait for at least 300 nanoseconds (ns) after the falling edge of SCL before it may change the state of the SDA line. This ensures that in systems where the clock transitions more slowly than SDA, no slave on the bus will see its SDA pin change state until its SCL pin is low, except for the start and stop conditions. If the driver were to fail to wait for the required time, there would be a risk that another slave could falsely interpret the change of SDA as a start or stop condition.

As shown in FIG. 2, to ensure that transition to passthrough mode occurs only at an appropriate positioning such that glitches are avoided, embodiments may enable passthrough mode only after the stop condition is realized, which occurs when the SCL is high and the master generates a logic high stop signal.

As described above, passthrough mode is enabled and disabled by the host. It is enabled by writing a register bit in the slave controller to the value '1'. This write causes a flip-flop (a passthrough-enable flop $124_c$ shown in FIG. 4) to transition from 0 to 1 at the very end of a register write transaction, immediately after the "stop" condition occurs on the I²C bus, as shown in FIG. 2. Likewise, to disable passthrough mode, the host writes the register bit to the value '0', which causes the passthrough-enable flop to transition from 1 to 0 on the stop condition which terminates the write. Thus passthrough mode is enabled and disabled only after a stop condition, since at this time it is known that both SCL and SDA will be high on both buses. If passthrough mode were enabled or disabled at other times, the SDA line could "glitch" or change at an undesired time, on one or both of the I²C buses. If this happened, it could violate the I²C timing requirements, causing false data transfers, false starts or stops, or other problems on either bus. By synchronizing the passthrough enable/disable to the stop condition in various embodiments, this risk is avoided.

When passthrough mode is enabled, any changes observed by the demodulator on the host's SCL line are driven onto the tuner's SCL line. Any changes observed by the demodulator on the host's SDA line will also be driven by the demodulator onto the tuner's SDA line, so the tuner will "see" all traffic that occurs on the host's I²C bus.

Whenever the host starts a new transaction, slave state machine $124_a$ in demodulator 120 will determine whether its address matches the 7-bit address being sent by host 110. If the address matches demodulator 120, then slave controller 124 will acknowledge host 110 (i.e., pull SDA low for 1 cycle), and the transaction will proceed as if passthrough mode were not enabled, except that all SCL and SDA activity will be mirrored onto secondary bus 135. The SCL line, which is driven by host 110, will be passed on to tuner 130. All SDA activity will also be mirrored to tuner 130, regardless of whether it is being driven by host 110 or demodulator 120. Even though tuner 130 does not respond to this traffic (since the address matched the demodulator slave), it will observe complete, well-formed I²C transactions which do not violate any aspects of the I²C protocol. This ensures proper behavior of the tuner's I²C slave controller.

If the address sent by host 110 does not match the demodulator slave device's address, then the host may be targeting another device on primary bus 115, or it may be targeting tuner 130. In the I²C protocol, after the first 8 bits (address+read/write bit) are received, the next clock cycle gives the targeted slave a chance to acknowledge that its address has matched, by pulling the SDA line low. For this cycle (the ACK cycle), demodulator slave controller 124 will reverse the direction of SDA transfer, to flow from tuner to host. During this cycle the host will observe whether or not the SDA line has been pulled low (address has been acknowledged) by the tuner. Also during this cycle, the demodulator slave controller 124 will observe whether the SDA line has been pulled low by the tuner. If the line was not pulled low, it means that no device on secondary bus 135 has matched the address. In this case, the host is most likely targeting another device on the primary bus 115, so demodulator slave controller 124 will take no special action. All subsequent activity on the primary bus 115 will simply be mirrored onto the tuner's bus, so that the tuner will observe complete, well-formed transactions.

On the other hand, if the address matches tuner 130, the tuner will pull SDA low during the ACK cycle, and this will be received by host 110 and will also be observed by the demodulator slave state machine $124_a$. If this happens, demodulator slave controller 124 will take an active role in directing passthrough traffic. For the remainder of the transaction, it will follow each cycle of the transaction between the host and tuner, in order to change the direction of drive for the SDA line according to the I²C protocol. Note that slave controller 124 does not need to know the tuner's address; it simply observes whether an ACK of the address occurred on secondary bus 135 to determine if it is to take an active role in directing the passthrough traffic.

For example, if the host has initiated an I²C write to the tuner, then the next 8 bits (after the address acknowledge cycle) represent data transfer from the host to the tuner, so slave controller 124 will enable SDA passthrough in the direction from the host to the tuner. On the next cycle, it is the tuner's turn to acknowledge receiving the data byte, so the direction of transfer is reversed for 1 cycle, so that the tuner can send its acknowledge to the host. The write transaction continues in this way, alternating the direction of transfer after each data byte or ACK cycle, until the host sends the "stop" condition which terminates the I²C transaction and returns the slave controller 124 to the "idle" state. In the idle state, slave controller 124 simply passes SCL and SDA in the direction from host to tuner, until the host disables passthrough mode.

If the host has initiated an I²C read from the tuner, then the next 8 bits (after the address acknowledge) represent data transfer from the tuner to the host. Since slave controller 124 is already directing the transfer from the tuner to the host during the address ACK cycle, it will continue to transfer in this direction while the tuner sends 8 bits of data to the host. On the next cycle, it is the host's turn to acknowledge receiving the data byte. The direction of transfer is reversed for 1 cycle (from host to tuner), so that the host may send its acknowledge to the tuner. The read transaction continues in this way, alternating the direction of transfer after each data byte or ACK cycle. If the host fails to acknowledge a byte (by leaving SDA high during the ACK cycle) or if the host sends a "stop" condition during the ACK cycle, then the transaction is finished and slave controller 124 returns to the "idle" state. All traffic is then passed from the host bus to the tuner bus, until passthrough is disabled by host 110.

In this way, slave controller 124 can "direct traffic" on the SDA line by snooping on I²C transactions between host and tuner, and changing the direction as needed. By using slave controller 124 to follow each cycle of the passthrough transaction, there is no need to directly connect or electrically short the buses together in passthrough mode. This simplifies the circuit design of the pads, and allows the two I²C buses to operate at different voltages in the system. That is in various embodiments, primary bus 115 and second bus 135 may be at two different voltage levels. Thus by buffering signaling through logic circuitry, embodiments can enable operating the different buses at different voltage levels.

As previously mentioned, masters and slaves on the I²C bus will drive the SCL and SDA signals only to a low level, and external resistors pull the signals to a high level. Therefore pads of various integrated circuits coupled to an I²C bus include or are coupled to an open-drain driver which is capable only of pulling the line low. Also coupled to or included in both such pads is an input glitch filter which is capable of removing brief pulses which are shorter than 50 ns on incoming signals to prevent an attached slave from falsely detecting extra clock edges, or falsely receiving a start or stop condition. The glitch filter can add a noticeable delay (greater than 100 ns) to the input signal path. However, it is not desirable to incur such large amounts of delay on signals that are being passed through in either direction, as timing violations could occur in passthrough mode. It is also not necessary for demodulator 120 to filter glitches on passthrough traffic, since the receiving I²C-compliant device must already have such filters. Thus embodiments may provide for handling such cases.

Figure 3:
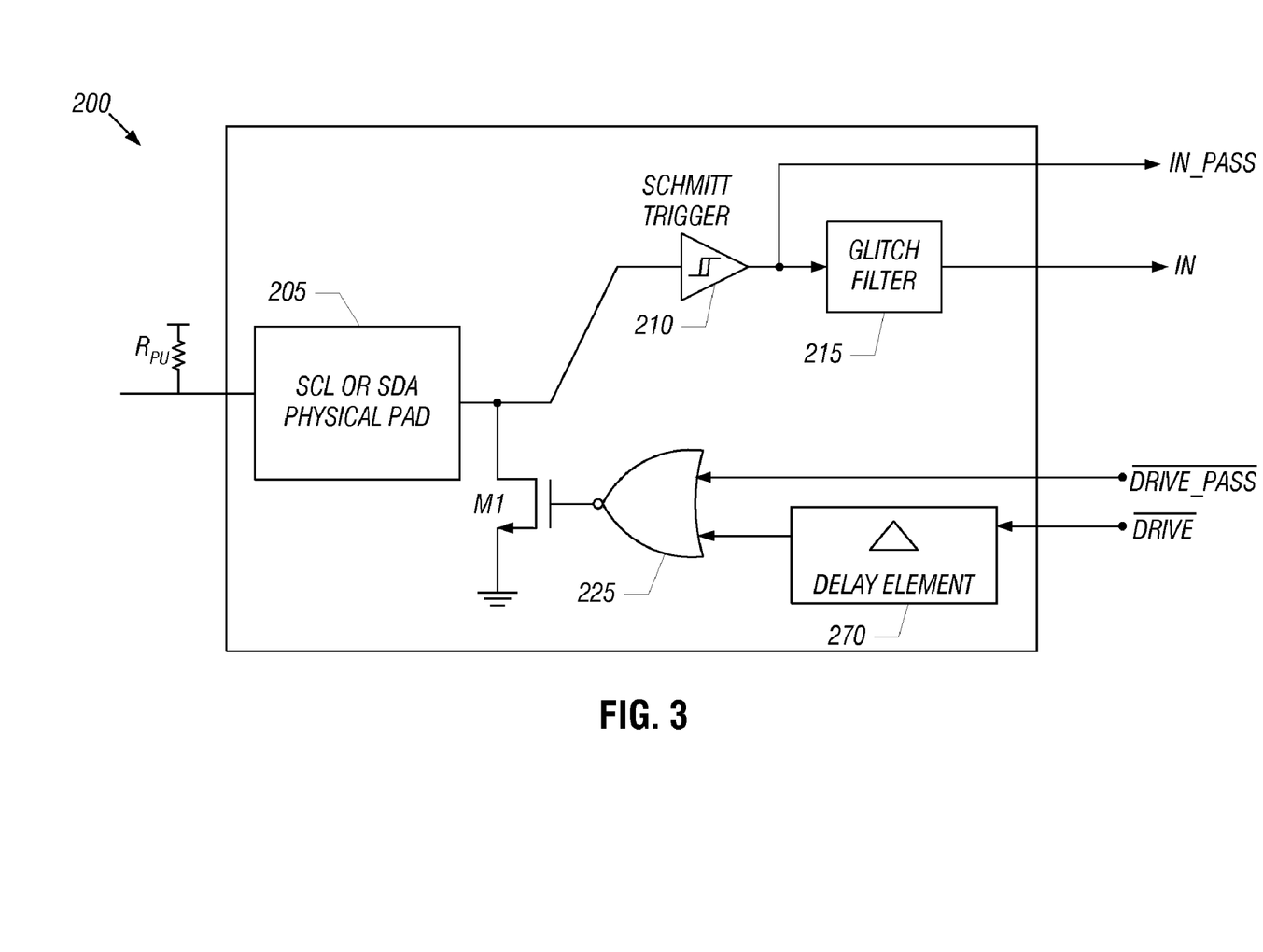
FIG. 3 is a simplified schematic diagram of a pad interface in accordance with an embodiment of the present invention.

Referring now to FIG. 3, shown is a simplified schematic diagram of a pad interface in accordance with an embodiment of the present invention. As shown in FIG. 3, pad interface 200 includes two parallel paths for incoming signals and two parallel paths for outgoing signals. As shown in FIG. 3, pad interface 200 may provide an interface between circuitry of an IC and a bus line that is coupled to an off-chip pull-up resistor $R_{PU}$. Pad interface 200 includes a physical pad 205, which may be a physical pad for either of a clock line or a data line of the bus (i.e., SCL or SDA). For incoming information from the bus, information is passed through a Schmidt trigger 210 and to one of the two parallel incoming paths, namely one that includes a glitch filter 215 (for connection to a slave controller, e.g., slave controller 124) and another that bypasses the filter (for passthrough connection to the other I²C bus). As will be discussed further below, the incoming signal information IN_PASS and IN, respectively corresponding to the bypass and delayed path, may be provided to various circuitry of passthrough logic. In one embodiment, glitch filter 215 can be implemented using analog circuitry (e.g., RC low-pass filter), however it is also possible to implement the filter using digital logic that repeatedly samples the input using an independent, fast-running clock.

In turn, signals to be output onto the bus from pad interface 200 may include passthrough signals that are provided on a first one of two parallel paths, namely a non-delayed path, as a $\overline{\text{DRIVE\_PASS}}$ signal. Additionally, output signals that are to be delayed in accordance with the I²C specification may be received as a $\overline{\text{DRIVE}}$ signal that is coupled to a delay circuit 220. Thus, the output path of the SDA pad includes delay circuit 220 which can add between approximately 300 ns to 900 ns of delay to an outgoing signal, depending on voltage, temperature and process. A delay in this range is required by the I²C specification (referred to as output data hold time). The specification ensures that the transitions of SDA for data and ACK bits only occur while SCL is low, and that transitions do not occur too close to the falling edge of SCL. The delay is provided for any changes made to the level of either host or tuner's SDA line by slave controller 124, including data bits and ACK cycles driven by the slave to host (in both passthrough and non-passthrough modes), and also includes level changes that are made as a result of direction changes on SDA during passthrough mode. In one embodiment, the delay circuit 220 can be implemented as a series of analog RC circuits, but it could also be implemented as a digital counter running on an independent clock.

Note that pad interface 200 includes a second connection (for output to pad 205) that bypasses delay circuit 220, as this delay is not desirable for SDA level changes of passthrough mode, since this added delay may induce I²C timing violations at the receiver of the signal. Thus the SCL and SDA signals that are being passed through are connected to the "non-delayed" output path to pad 205. In one embodiment, the parallel output paths both provide signal information to a logic gate 225, which may be an XOR gate, the output of which is used to gate a metal oxide field semiconductor field effect transistor (MOSFET), namely NMOS M1 having a source terminal coupled to a ground level and a drain terminal coupled to pad 205 such that when one of the drive signals (i.e., $\overline{\text{DRIVE\_PASS}}$ or $\overline{\text{DRIVE}}$) is enabled, M1 switches on and thus pulls pad 205 low. In some embodiments, an internal master controller (e.g., master controller 126) may also connect to the "non-delayed" output path to the tuner's SCL and SDA pins, as the master may include its own SDA delay using a digital counter, such that additional delay is not needed.

Figure 4:
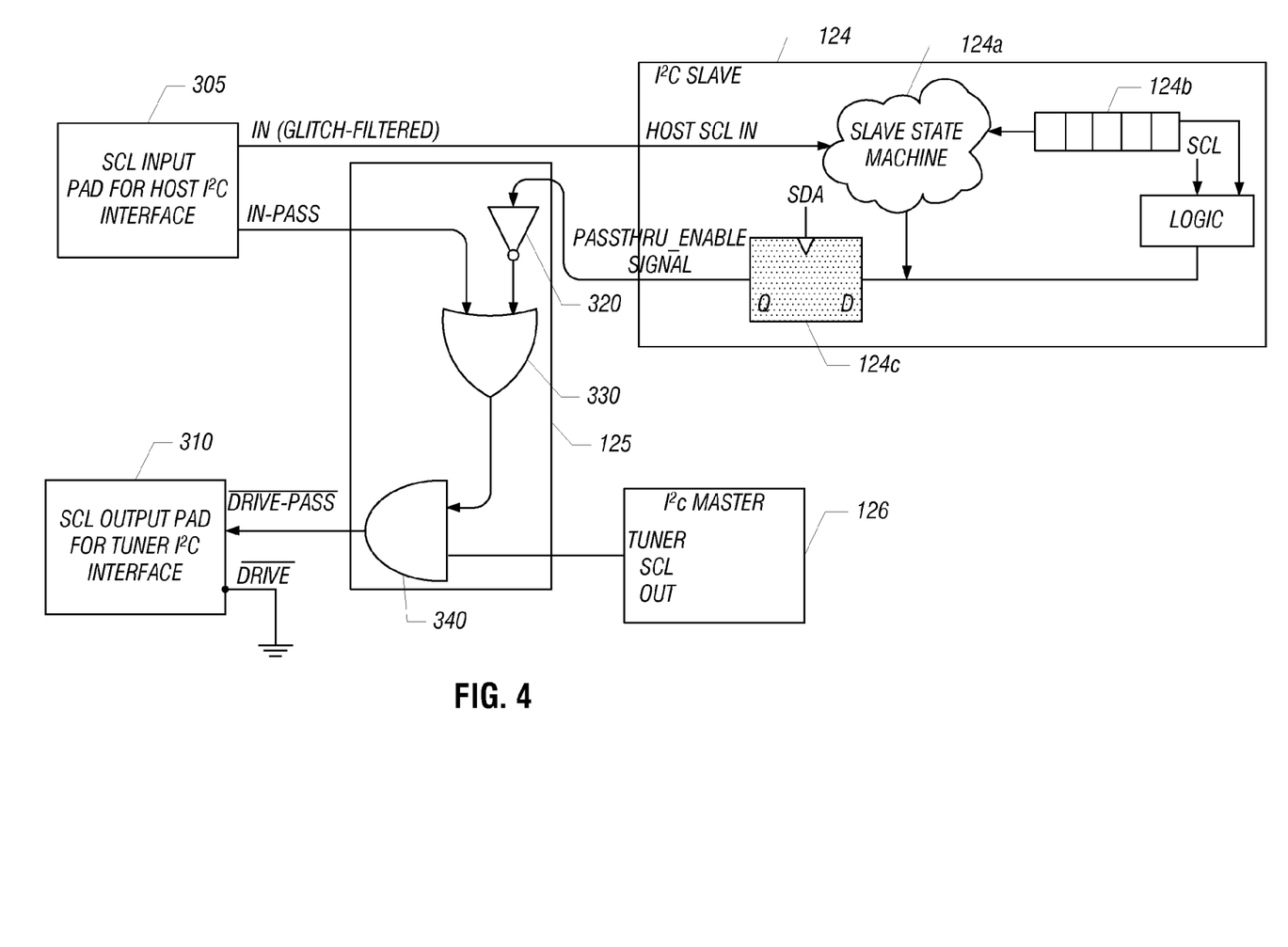
FIG. 4 is a block diagram of passthrough logic for a clock line in accordance with one embodiment of the present invention.

Referring now to FIG. 4, shown is a block diagram of a portion of passthrough logic in accordance with one embodiment of the present invention. More specifically, FIG. 4 shows passthrough logic for handling control of a clock signal. As shown in FIG. 4, two pads 305 and 310, which may be pads of a slave device, such as a demodulator IC, may be used to receive a clock input signal from a system bus (pad interface 305) to provide the output signal to the secondary bus (pad interface 310). Thus both of pad interface 305 and 310 may be configured such as described above in FIG. 3. As shown in FIG. 4, an incoming clock signal is provided on two different paths, namely a glitch-filtered path that is provided to slave control 124 and a second, non-delayed path that is provided to passthrough logic 125. Note that only a portion of passthrough logic 125 shown in FIG. 4.

As shown, a passthrough_enable signal is output from a flip-flop 124$_c$ that in turn receives an input from slave state machine 124$_a$, that in turn receives the system clock signal and the value of the passthrough enable mode bit from register 124$_b$. Note that flip-flop 124$_c$ is clocked by the data signal, SDA. When the output of flip-flop 124c corresponds to one, passthrough mode is enabled and the system clock signal is passed through output pad interface 310. More specifically, passthrough logic 125 includes an inverter 320 that inverts the value of the passthrough enable signal and provides it to an OR gate 330 that is further coupled to receive the clock signal from the non-delayed line, as IN_PASS. The output of OR gate 330 is coupled to a second logic gate 340, which may be an AND gate further coupled to receive a clock signal generated from master controller 126. Note that the value of this signal is high when the master is inactive, including when passthrough mode is active. Accordingly, the clock signal passes out of logic gate 340 as $\overline{\text{DRIVE\_PASS}}$ and through output pad 310 to the secondary bus and is coupled to the tuner. Note for the clock signal, the delayed output path of $\overline{\text{DRIVE}}$ is not used.

Thus when passthrough mode is enabled, the SCL signal from the host is passed to the tuner, adding as little delay as possible to the signal. The signal comes from the non-glitch-filtered (fast) path on the host SCL input, and goes to the non-delayed (fast) output path on the tuner SCL output. Note that passthrough logic 125 may avoid the possibility of glitching when passthrough mode is enabled or disabled. The passthrough enable flop $124_c$ can only change state when both SCL signals are high, and there is no bus activity on either bus. When passthrough is not enabled, internal master controller 126 may drive its internally-generated clock to the tuner. This path is connected to the "passthrough" (non-delayed) output path in the SCL pad, as it is not necessary to add more delay to this signal, in some implementations.

Figure 5:
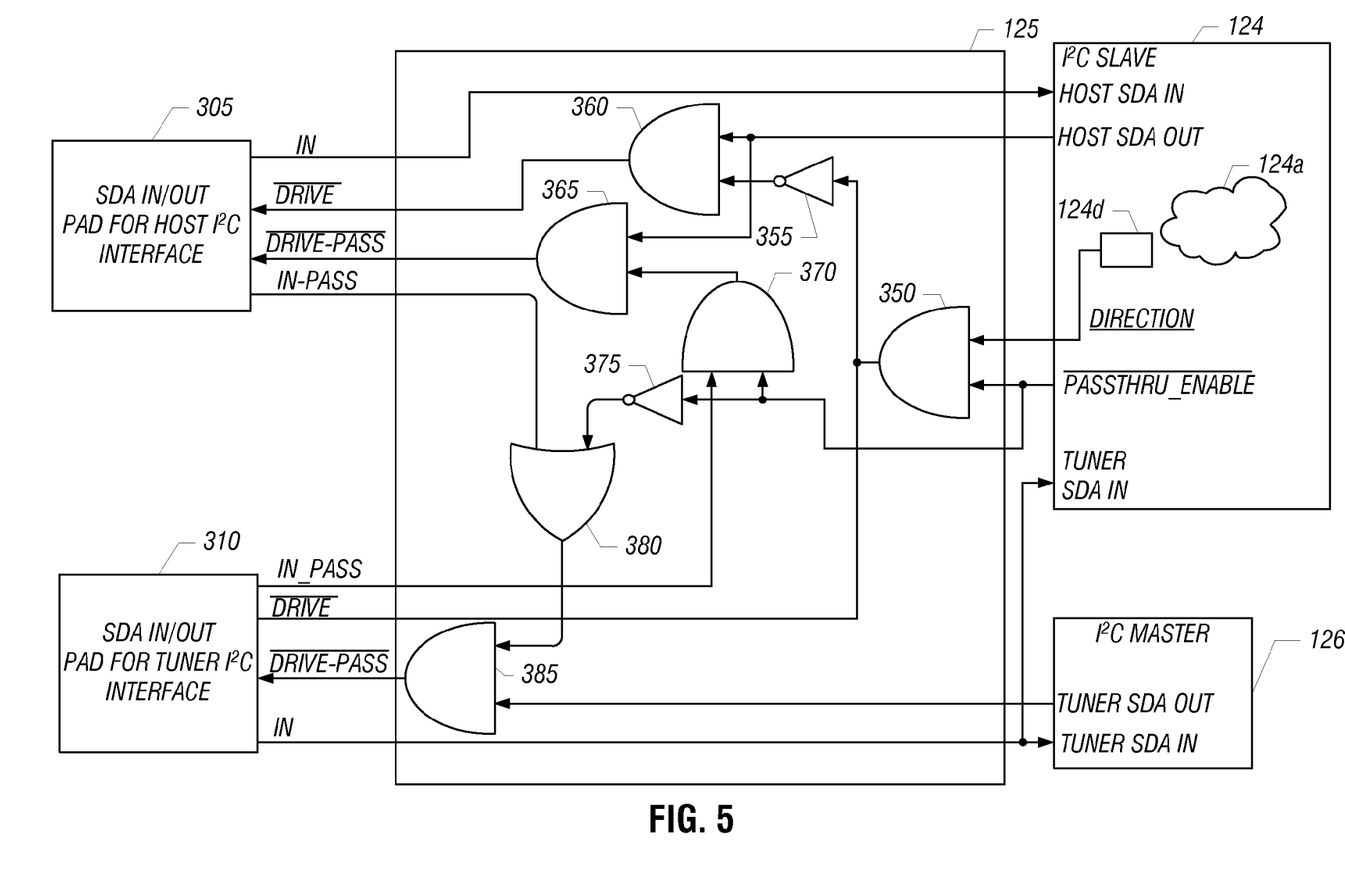
FIG. 5 is a block diagram of passthrough logic for a data line in accordance with an embodiment of the present invention.

Referring now to FIG. 5, shown is a block diagram of passthrough logic for a data line in accordance with an embodiment of the present invention. As shown in FIG. 5, passthrough logic 125 further includes circuitry to enable passthrough of data between an input pad interface 305 and an output pad interface 310. As with the logic described above for clock passthrough, passthrough logic 125 may be controlled by slave state machine $124_a$, which, in addition to the passthrough enable signal, also generates a direction signal based on snoop information of the communications on both buses such that slave controller 124 can control a direction of data transfer based on this snooped information. Specifically, slave state machine $124_a$ generates the direction signal with a first state (e.g., logic high) to enable tuner-to-host communication and a second state (e.g., logic zero) to enable host-to-tuner communication.

Passthrough logic 125 thus provides for passthrough communication, without a direct electrical connection between the two buses, while eliminating the possibility of glitching either bus. As described above, slave controller 124 generates the "passthrough_enable" signal from flop $124_c$ which changes state only on the I²C "stop" condition at the end of the register write by the host, and also generates the "direction" control (which can also be generated from a direction flop $124_d$ so it cannot glitch). The direction flop $124_d$ changes state on the falling edge of SCL, under control of the slave state machine $124_a$. The direction flop $124_d$ only has an effect on the system when passthrough is enabled and only changes state during transactions where the host is communicating with the tuner.

As shown in FIG. 5, passthrough logic 125 includes various logic gates to control and buffer information between the two buses without direct electrical coupling of the two buses. Specifically a logic gate 350 which may be an AND gate is coupled to receive both the direction control signal and the passthrough enable signal. The output of this logic gate thus provides the $\overline{\text{DRIVE}}$ signal to pad interface 310 and further provides the input to an inverter 355, the output of which is provided to a logic gate, e.g., an AND gate 360 that is further coupled to receive data from slave controller 124 such that the output of logic gate 360 provides the $\overline{\text{DRIVE}}$ signal to pad interface 305. The data output from slave controller 124 is further coupled to an AND gate 365, which provides the $\overline{\text{DRIVE\_PASS}}$ signal to pad interface 305. Logic gate 365 is further coupled to receive the output of AND gate 370, which receives as inputs the "passthrough_enable" signal and the $\overline{\text{IN\_PASS}}$ signal from pad interface 310. The "passthrough_enable" signal is further coupled through an inverter 375 to an OR gate 380, which is further coupled to receive the $\overline{\text{IN\_PASS}}$ signal from pad interface 305, which is provided to AND gate 385, which also receives data from master controller 126 to thus provide the $\overline{\text{DRIVE\_PASS}}$ signal. Note that the tuner SDA out signal from master controller 126 is high when the master in inactive, including when passthrough is enabled. Note that tuner data provided via the IN line from pad interface 310 is further coupled to both master controller 126 and slave controller 124. Slave controller 124 may receive this signal so that it can observe the tuner's ACK signal in passthrough mode.

Logic 125 may thus ensure that a given delay is included whenever slave controller 124 pulls down or releases the host's SDA line. However, no delay is added for passthrough data in either direction. Still further, slave controller state machine $124_a$ may ensure that neither SDA signal will glitch when transfer direction is changed during passthrough mode.

Thus when passthrough is disabled, passthrough logic 125 ensures the following: slave controller 124 can respond to the host, using the delayed SDA output path (the host's SDA is not passed to the tuner or vice-versa) and master controller 126 can drive the tuner's SDA through the non-delayed output path. When passthrough is enabled, passthrough logic 125 ensures the following: when direction=0 (host-to-tuner): slave controller 124 can still respond to the host, using the delayed SDA output path; the host's SDA is passed to the tuner through the non-delayed input/output paths; the tuner's SDA is not passed to the host. When direction=1 (tuner-to-host): the tuner's SDA is passed to the host through the non-delayed input/output paths; the host's SDA is not passed to the tuner. When the direction signal changes state, any change in level (pull-down or release) of either SDA line (host or tuner) will occur through the pad's delayed SDA output path, rather than the non-delayed path, to prevent glitching of the SDA signal on either bus.

Figure 6:
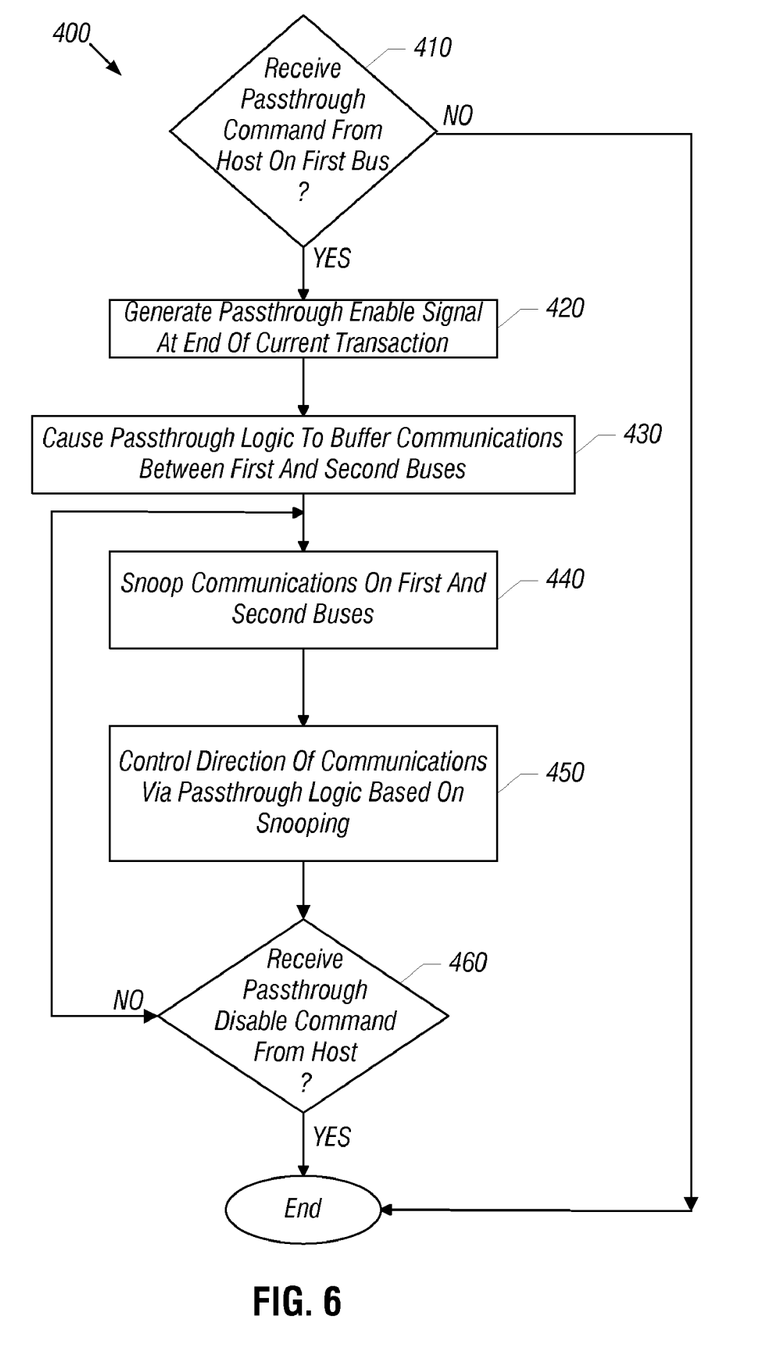
FIG. 6 is a flow diagram of a method in accordance with one embodiment of the present invention.

Referring now to FIG. 6, shown is a flow diagram of a method in accordance with one embodiment of the present invention. As shown in FIG. 6, method 400 may be used by a slave device such as a demodulator that has passthrough logic with the capability to passthrough communications from a primary bus to a secondary bus, to which another slave device, such as an RF tuner may be coupled. In this way, the RF tuner can be shielded from noise due to communications on the first bus, when those communications do not implicate the tuner.

As shown in FIG. 6, method 400 may begin by determining whether a passthrough command has been received from a host on a first bus (diamond 410). In one embodiment, the passthrough command may be realized by writing of a passthrough enable bit to an I²C register of a slave controller of the demodulator from the host, which may be a CPU or other controller of a system. If such a command is received, control passes to block 420, where a passthrough enable signal is generated at an end of a current transaction. More specifically, as discussed above a slave state machine may cause generation of a passthrough enable signal at the conclusion of the transaction in which the passthrough command was received, namely after a stop signal is sent to conclude the transaction. Control then passes to block 430, where passthrough logic of the demodulator may cause communications to be buffered between the first and second buses (block 430). That is, as described above passthrough logic may enable mirroring of communications on the first bus to the second bus and vice-versa, without electrical connection between the buses. That is, by using passthrough logic controlled by a slave state machine in accordance with an embodiment of the present invention, this mirrored communication can be realized while the two buses remain electrically separated such that they can operate at the different voltages.

Still referring to FIG. 6, control then passes to block 440, where communications on the first and second buses may be snooped. More specifically, the slave state machine may receive data communicated on both buses and analyze the data to determine the proper direction of communication flow between the devices. In this way, the slave state machine can then control the direction of communications via passthrough logic based on this snooping (block 450). In this way information may be provided from host to tuner and tuner to host. Understand that while described for example as host communications, it is to be understood that embodiments can be used to connect any two devices that may be present in a system through an intermediary device, such as the demodulator of FIG. 1.

During such snooping, it may be determined whether a passthrough disable command has been received from the host (diamond 460). In one embodiment, this passthrough disable signal may be a command from the host to the demodulator on the first bus to cause the passthrough enable bit to be reset within a register of the slave controller. Upon receipt of such a command, method 400 may conclude so that passthrough communications are disabled. In one embodiment, the passthrough enable signal generated as described above in block 420 may be disabled, at the conclusion of the transaction in which the passthrough disable command was received. In the absence of such a passthrough disable command from host, control passes from diamond 460 back to block 440 for further snooping of communications on the different buses. While shown with this particular implementation in the embodiment of FIG. 6, the scope of the present invention is not limited in this regard.

Figure 7:
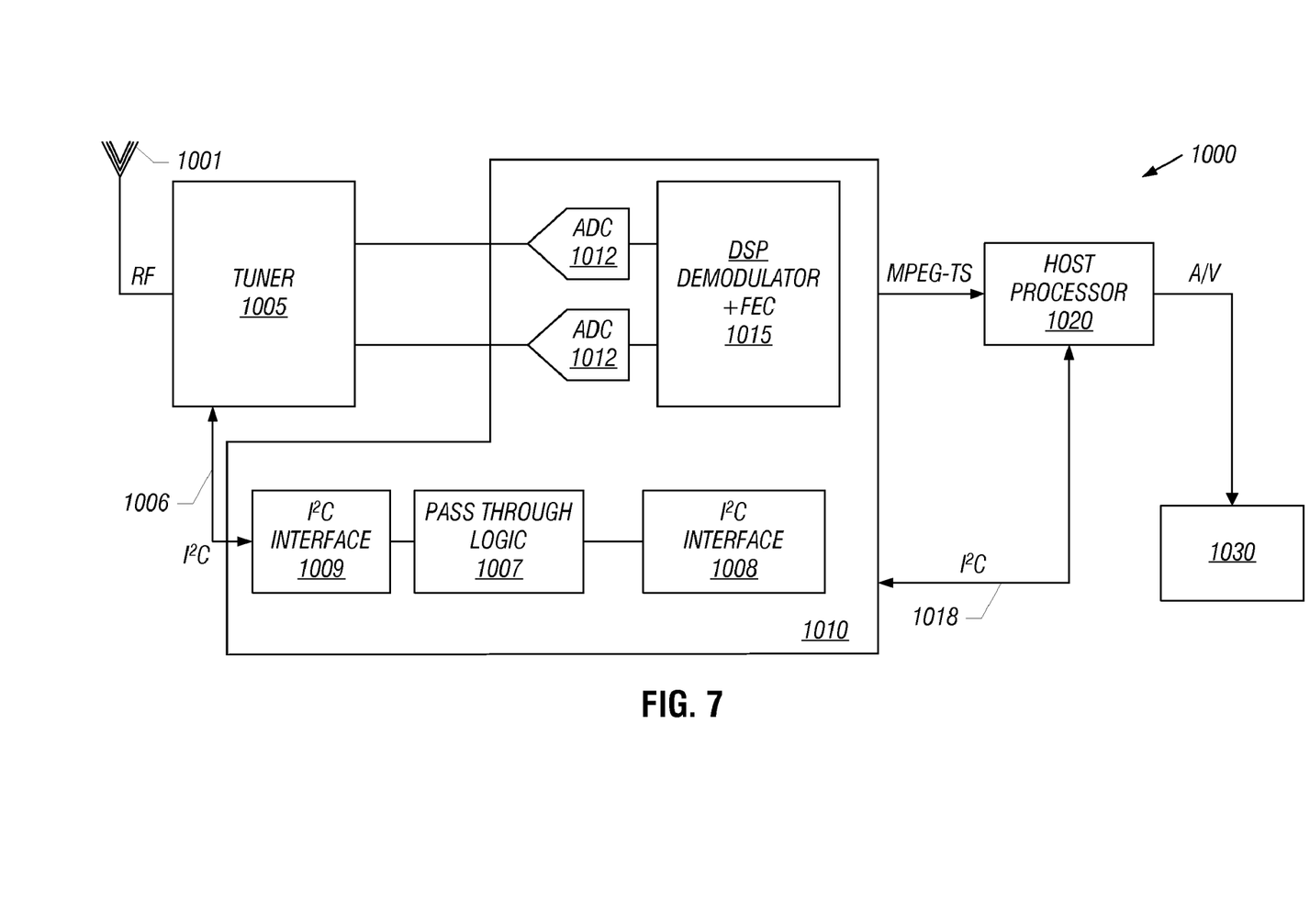
FIG. 7 is a block diagram of a system in accordance with one embodiment of the present invention.

Embodiments may be implemented in many different system types, such as wireless devices, set-top boxes, televisions, and so forth. Some applications may be implemented in a mixed signal circuit that includes both analog and digital circuitry. Referring now to FIG. 7, shown is a block diagram of a system in accordance with one embodiment of the present invention. As shown in FIG. 7, system 1000 may include a television that is coupled to receive a RF signal from an antenna source 1001 such as an over-the-air antenna 1001. However, in other embodiments the original source may be cable distribution, satellite, or other source that is then redistributed through a digital terrestrial network. The incoming RF signal may be provided to a tuner 1010 which may be, in one embodiment a single-chip mixed signal device.

More specifically, the incoming RF signal is provided to tuner 1005 for tuning to a desired signal channel. While the scope of the present invention is not limited in this regard, tuner 1005 may include various circuitry. For example, in one embodiment tuner 1005 may include a bandpass filter having an output coupled to a low noise amplifier (LNA) to receive and amplify the RF signal. The output of the LNA may be provided to another bandpass filter that in turn is coupled to a mixer. In turn, the mixer downconverts the incoming RF signal to a complex output. This complex output (i.e., I/Q data) may be at intermediate frequency (IF), low-IF, or zero-IF, in different systems. As shown in FIG. 7, tuner 1005 may be coupled to a demodulator 1010 that includes various circuitry, including an analog front end having analog-to-digital converters (ADCs) 1012 to convert the incoming I/Q data to digital form, to provide a modulated bitstream of a desired signal channel. The signal channel information may be provided to a digital signal processor (DSP) 1015 which can perform various digital-based processing operations, such as equalization, demodulation, forward error correction (FEC), filtering, and so forth. Thus the output of DSP 1015 may be a digital bit stream, such as a MPEG transport stream (MPEG-TS) that can be provided to a host processor 1020.

As further shown in FIG. 7, demodulator 1010 further includes an I$^2$C interface 1008, which may be an interface in accordance with an embodiment of the present invention including pads and interface logic to provide connection to an I$^2$C bus 1018 coupled between host processor 1020 and demodulator 1010. I$^2$C interface 1008 also may include a slave controller which includes a slave state machine in accordance with an embodiment of the present invention to receive an indication of a passthrough mode and to cause passthrough communications to occur between I$^2$C interface 1008 and a secondary I$^2$C interface 1009 via passthrough logic 1007. In this way, passthrough mode can be enabled to allow, e.g., command information from host processor 1020 to be transmitted across primary I$^2$C bus 1018 and through the interfaces and along a secondary I$^2$C bus 1006 to tuner 1005. In addition, information from tuner 1005 may be communicated to host processor 1020 via the same path.

Referring still to FIG. 7, the digital output path from demodulator 1010 may be coupled to host processor 1020, which includes various functionality. For example, host processor 1020 further processes the transport stream into an audio visual signal that may be provided to a display 1030, such as a computer monitor, flat panel display or other such display.

While shown with this particular implementation in the embodiment of FIG. 7, it is to be understood the scope of the present invention is not limited in this regard. Furthermore, it is to be understood that embodiments may be implemented in many different devices, such as receivers, transmitters and so forth. Still further, control logic, program storage or other computer readable media may be present to store instructions that when executed enable passthrough communications between a first bus and a second bus, under control of a host such that during significant portions of operation, the second bus can be in a so-called quiet mode to avoid noise on the busy first or primary bus.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first data pad and a first clock pad to couple the apparatus to a host device via a first bus;
   a second data pad and a second clock pad to couple the apparatus to a slave device via a second bus;
   a first parallel input path from the first data pad to a slave controller of the apparatus and a second parallel input path from the first data pad to the second data pad, wherein the first parallel input path comprises a glitch filtered path and the second parallel input path comprises an unfiltered path: and
   passthrough logic to couple host data and a host clock from the first bus to the second bus and to couple data from the second bus to the first bus during a passthrough mode, wherein the first and second buses are electrically decoupled during the passthrough mode.

2. The apparatus of claim 1, wherein the passthrough mode between the host device and the slave device is controlled by the host device.

3. The apparatus of claim 2, wherein the host device is to write a passthrough enable indicator of a register of the apparatus to enable the passthrough mode, the passthrough mode to begin at an end of a data transaction from the host device including the passthrough enable indicator.

4. The apparatus of claim 2, wherein the host device is to enable the passthrough mode to provide information to the slave device and to disable the passthrough mode when the host device is to provide information to the apparatus.

5. The apparatus of claim 2, further comprising a slave controller to snoop passthrough communications during the passthrough mode and to control a direction of the passthrough communications through the first data pad and the second data pad based on the snooping.

6. The apparatus of claim 1, wherein the first bus is to operate at a first voltage and the second bus is to operate at a second voltage.

7. A system comprising:
a host device coupled to a first bus, the first bus coupled to a plurality of slave devices;
a first slave device coupled to the host device via the first bus and including a slave state machine of a slave controller to handle receipt and transmission of information on the first bus, a first data pad coupled to the first bus, a second data pad coupled to a second bus, a first parallel input path from the first data pad to the slave controller and a second parallel input path from the first data pad to the second data pad, wherein the first input path comprises a glitch filtered path and the second input path comprises an unfiltered path; and
a second slave device coupled to the first slave device via the second bus, wherein the second bus is to be disabled in absence of communications to or from the second slave device, and the slave state machine of the first slave device is to minor communication along the first bus to the second slave device via the second bus.

8. The system of claim 7, wherein the first slave device further comprises passthrough logic to buffer the communication along the first bus to the second bus without a direct electrical connection between the first and second buses.

9. The system of claim 7, wherein the first slave device includes:
a first parallel output path from the slave controller of the first slave device to the first data pad; and
a second parallel output path from the second data pad to the first data pad, wherein the first output path comprises a delayed path and the second output path comprises an undelayed path.

10. The system of claim 7, wherein the first slave device further comprises a first delay element clocked by a data signal of the first bus and to change state only when a clock signal of the first bus is in a high state.

11. The system of claim 10, wherein the mirrored communication is to begin when the first delay element changes state to an enable mode for the mirrored communication.

12. The system of claim 7, wherein the first bus is to operate at a first voltage and the second bus is to operate at a second voltage.

13. A method comprising:
determining whether a passthrough command has been received within a transaction from a host to a first slave device on a first bus to which a plurality of slave devices including the first slave device are coupled;
setting a passthrough mode indicator in a control register of the first slave device when the passthrough command has been received;
providing a passthrough enable signal to a passthrough circuit of the first slave device responsive to the passthrough mode indicator to enable a passthrough mode; and
buffering communications between the first bus and a second bus coupled between the first slave device and a second slave device in the passthrough mode, including providing the communications from an input pad of the first slave device to a state machine of the first slave device on a glitch filtered path, and providing the communications from the input pad to an output pad of the first slave device coupled to the second bus on an unfiltered path, the glitch filtered path and the unfiltered path comprising parallel paths from the input pad.

14. The method of claim 13, further comprising snooping data and control information communicated on the first and second buses and analyzing the data and control information in the first slave device to determine a direction of communication flow between the host and the second slave device.

15. The method of claim 14, further comprising controlling the direction of communication flow via transmission of a direction signal based on the snooping.

16. The method of claim 13, further comprising buffering the communications without electrically coupling the first and second buses, the first and second buses operating at different voltages.

* * * * *

UNITED STATES PATENT AND TRADEMARK OFFICE
CERTIFICATE OF CORRECTION

| | | |
|---|---|---|
| PATENT NO. | : 8,151,029 B2 | Page 1 of 1 |
| APPLICATION NO. | : 12/981769 | |
| DATED | : April 3, 2012 | |
| INVENTOR(S) | : Scott Haban et al. | |

It is certified that error appears in the above-identified patent and that said Letters Patent is hereby corrected as shown below:

Column 13:
Line 34, "minor communication" should be --mirror communication--

Signed and Sealed this
Seventeenth Day of July, 2012

David J. Kappos
*Director of the United States Patent and Trademark Office*